June 30, 1959 H. C. HEBERT 2,892,531
APPARATUS FOR GROUPING CONTAINERS FOR TRANSFER TO STACKS
Filed Feb. 19, 1957 3 Sheets-Sheet 1
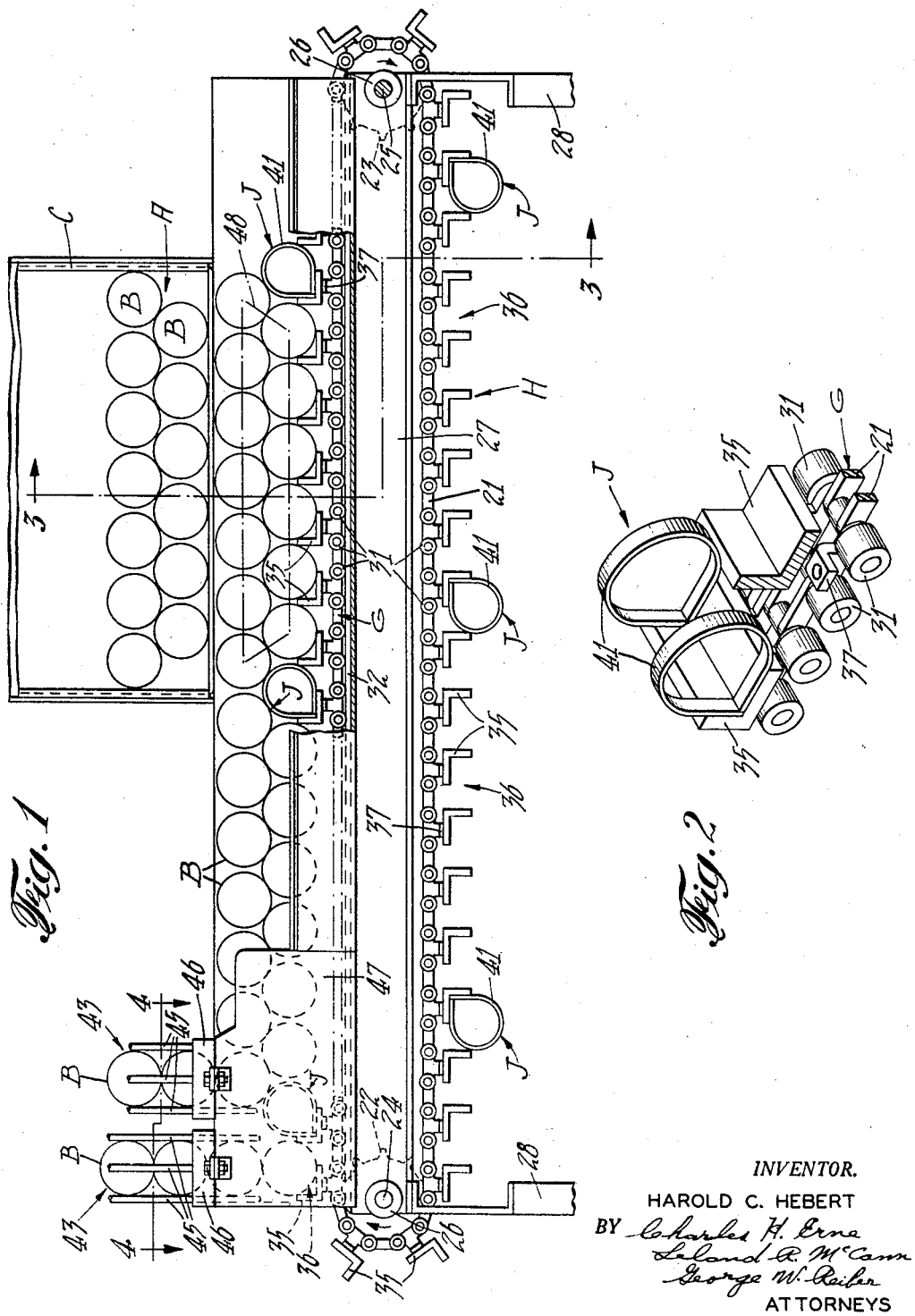
INVENTOR.
HAROLD C. HEBERT
BY Charles H. Erne
Leland R. McCann
George W. Reiber
ATTORNEYS June 30, 1959  H. C. HEBERT  2,892,531
APPARATUS FOR GROUPING CONTAINERS FOR TRANSFER TO STACKS
Filed Feb. 19, 1957  3 Sheets-Sheet 2
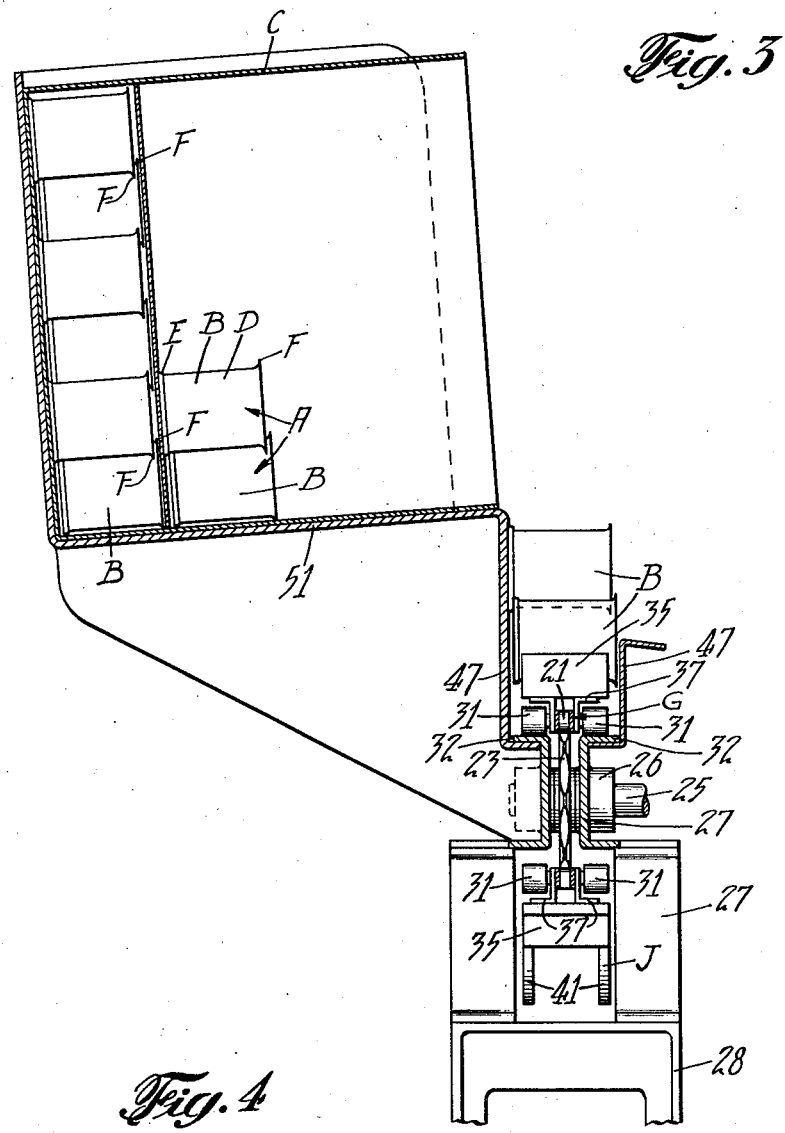
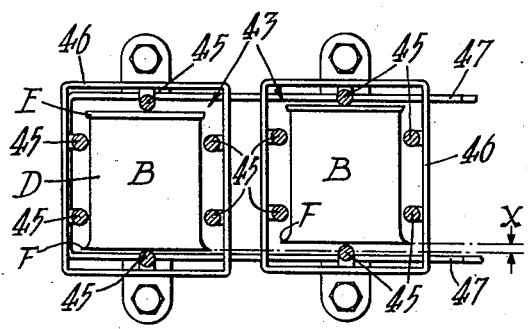
INVENTOR.
HAROLD C. HEBERT
ATTORNEYS

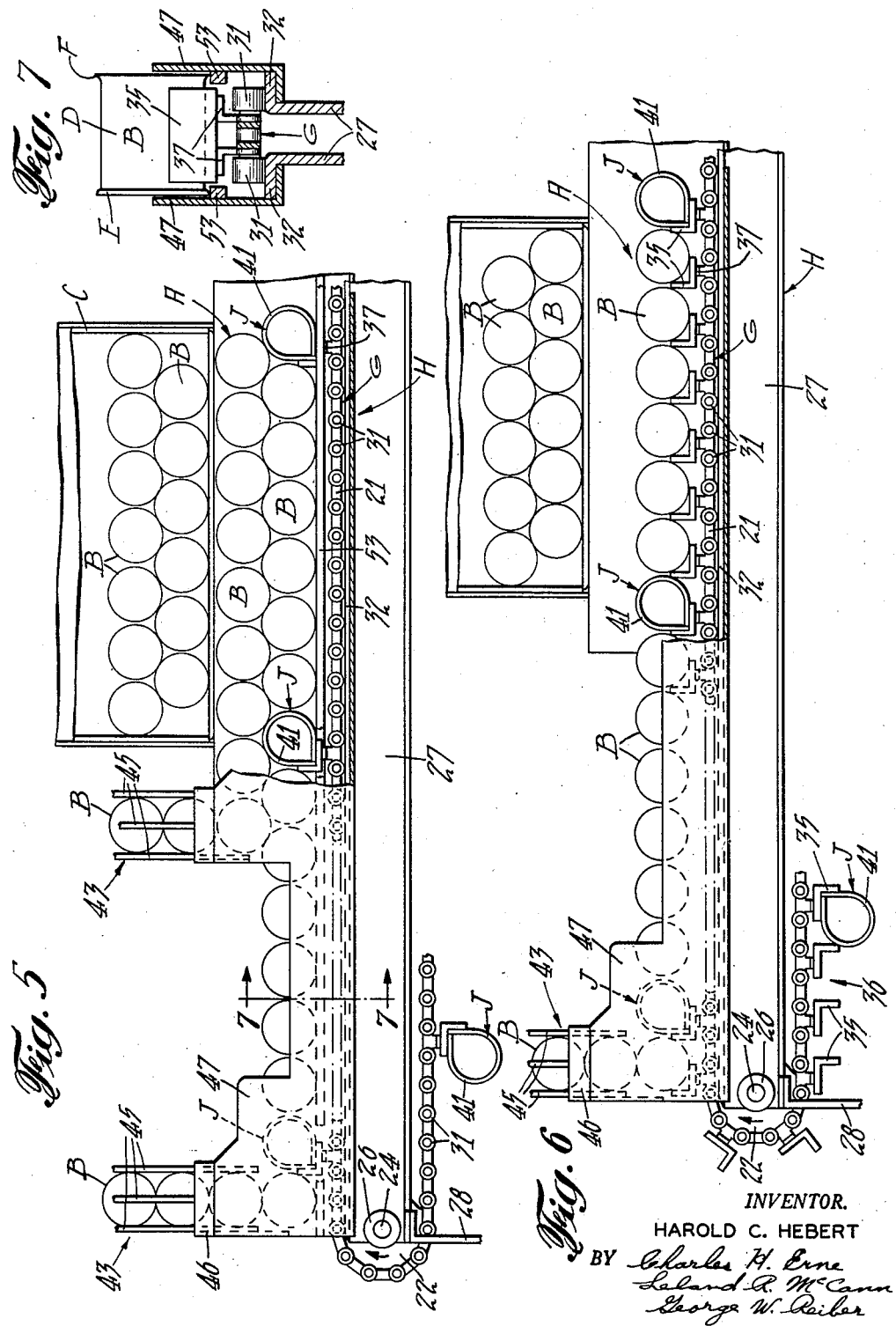

United States Patent Office 2,892,531
Patented June 30, 1959

1

2,892,531

APPARATUS FOR GROUPING CONTAINERS FOR TRANSFER TO STACKS

Harold C. Hebert, Tampa, Fla., assignor to American Can Company, New York, N.Y., a corporation of New Jersey Application February 19, 1957, Serial No. 641,174

7 Claims. (Cl. 198—35)

The present invention relates to the stacking of tubular articles such as cans and containers into shipping boxes and storage bins and the like and has particular reference to devices for grouping the containers for transfer to the boxes or bins This application is a companion to my two following applications filed in the United States Patent Office, Serial Number 641,173, filed February 19, 1957, on Apparatus for Interlocking Flanges of Containers Arranged for Transfer to a Stack, and Serial Number 641,175, filed February 19, 1957, now Patent No. 2,828,000, on Apparatus for Grouping Containers in Different Combinations for Transfer to Stacks.

In the shipment or storage of empty cans or containers in bulk, the containers usually are stacked in orderly superimposed rows so as to occupy the least space and to facilitate handling during unloading. This stacking of the containers usually is effected manually by an operator having a fork provided with tines arranged to fit into a group of a predetermined number of containers so that he can lift them from a delivery conveyor and place them in stacked formation in the shipping boxes or storage bins.

An object of the instant invention is the provision of an apparatus for grouping the containers and delivering the groups to the operator so that he can readily transfer the groups individually to the stack without disturbing other adjacent groups.

Another object is the provision of such an apparatus wherein groups of multiple rows superimposed one upon another are readily produced for transfer as individual groups to a stack.

Numerous other objects and advantages of the invention will be apparent as it is better understood from the following description, which, taken in connection with the accompanying drawings, discloses a preferred embodiment thereof.

Referring to the drawings:

Figure 1 is a side elevation of an apparatus embodying the instant invention, with parts broken away;

Fig. 2 is an enlarged perspective view of a container displacement element on a conveyor used in the apparatus;

Fig. 3 is an enlarged transverse sectional view taken substantially along the broken line 3—3 in Fig. 1, with parts broken away;

Fig. 4 is an enlarged fragmentary plan view taken substantially along the broken line 4—4 in Fig. 1;

Figs. 5 and 6 are side elevations similar to Fig. 1 and showing modified forms of the invention, parts being broken away; and Fig. 7 is a transverse sectional view taken substantially along the line 7—7 in Fig. 5 with parts broken away.

As a preferred or exemplary embodiment of the instant invention Figs. 1, 2, 3, and 4 of the drawings disclose an apparatus for producing groups A of orderly arranged empty cylindrical sheet metal cans or containers B to facilitate manual stacking of the cans into receptacles C

2 such as shipping boxes and storage bins and the like. The empty containers B comprise bodies D (Figs. 3 and 4) having bottom ends secured in place by suitable seams E and usually have outwardly projecting flanges F surrounding their top open ends for the reception of covers after filling.

The containers B are received from any suitable source of supply such as the manufacturing lines or from storage and are fed in a single line, substantially continuous procession, in an on-side or horizontal position, to a preferably horizontal continuously moving conveyor G (Figs. 1, 2 and 3) which carries them to an operator's station H (Fig. 1) for transfer into a receptacle C disposed in front of or adjacent the station. The conveyor G at intervals along its length carries displacement elements or dummy containers J between which rows of containers B are formed as the containers are fed to the conveyor. The containers B disposed between two adjacent or successive displacement elements J constitute a group A. Each such group is readily lifted off the conveyor by the operator through use of a tined fork, as each group enters the operator's station H, without disturbing the following group disposed between the following displacement elements.

In some cases as shown in Fig. 6 single row groups A of a predetermined number of containers B in each group may be required for stacking in the receptacles C whereas in other cases multiple superimposed row groups such as disclosed in Figs. 1 and 5 may be required for efficient stacking. The instant invention is equally will adapted to both of these cases.

Referring now to the detailed construction of the apparatus shown as the preferred form of the invention, the conveyor G preferably is a horizontally disposed endless chain 21 which operates over a pair of spaced sprockets 22, 23 mounted on respective shafts 24, 25 journaled in bearings 26 in an elongated frame 27 preferably carried on legs 28. The sprocket shaft 25 preferably is the drive shaft of the conveyor and is rotated preferably continuously in any suitable manner. The upper run of the conveyor chain 21 preferably is supported against sagging by a plurality of rollers 31 which are attached to the chain at intervals along its length and ride along horizontal tracks 32 formed on the frame 27.

Along its entire length, the conveyor chain 21 carries angle shaped container support or spacer members 35 which are spaced apart a distance substantially equal to the outside diameter of the containers B and which define between them open pockets 36 for the reception of the containers B. These spacer members 35 are secured to lugs 37 (see Fig. 2) formed on the chain 21.

The displacement elements J preferably are substantially cylindrical rings or hoops 41 having an outside diameter substantially equal to the outside diameter of the containers B and serve as dummy containers occupying the space of one container. These displacement rings 41 preferably are used in pairs disposed in axial alignment with each other across the conveyor G and are secured to certain of the spacer members 35, depending upon the number of containers B in each group A. As an example of such spacing, the drawings show the displacement rings 41 attached to each seventh spacer member 35 so as to set off six spaces for containers between successive displacement rings.

The containers B are delivered to the conveyor G by conventional runways each having a vertical section 43 (Figs. 1 and 4) which terminates over the top of the conveyor in spaced relation thereto so as to drop the containers individually onto the conveyor as the latter advances toward the operator's station H. These runway sections 43 preferably are composed of vertically disposed guide rails 45 held in place by surrounding collars 46. The lowermost collar 46 of each runway section preferably is secured to a pair of vertically disposed supporting guide plates 47 which extend up from the frame 27. The guide plates 47 are disposed on opposite sides of the path of travel of the conveyor G and are spaced apart a distance slightly greater than the heights of the containers B so as to keep the containers in line as they advance with the conveyor.

Where a multiple row group A of containers is to be formed on the conveyor G, two or more container delivery runway sections 43 are used to deliver the containers B to the conveyor. As an example of such delivery of containers, Figs. 1 to 4 inclusive of the drawings show two runway sections 43 disposed adjacent each other and adjacent the entrance end of the conveyor for delivering two superimposed rows of containers A to the conveyor. Containers B from the runway section 43 at the left as viewed in Fig. 1 drop into the pockets 36 between the spacer members 35 and thus form the lower row of the two row group. When a displacement element J passes under this runway section 43 it supports the vertical stack of containers in the section and thereby prevents a container from being delivered to the conveyor, thus setting off groups of six lower row containers on the conveyor.

The runway section 43 at the right as viewed in Fig. 1 is designed to deliver containers B on top of the first row of containers as delivered by the runway section 43 as the conveyor moves past. This second or auxiliary runway section 43 delivers a continuous row of containers superimposed upon the lower row in the valleys between the first row containers to produce a staggered formation.

Thus, by reason of this two row superimposed staggered formation, the displacement elements J set off or produce trapezoidal shaped groups A of containers as outlined by the dot and dash line 48 in Fig. 1 so that when a group so formed reaches the operator's station H, it may be readily picked off on a conventional tined fork by the operator without disturbing the next adjacent following group already formed or being formed on the conveyor. The group A of containers removed from the conveyor by the operator is stacked in the shipping receptacle C as hereinbefore mentioned.

Where such shipping receptacles are of comparatively small dimensions they are supported on a bracket 51 attached to one of the side plates 47 of the apparatus, at the operator's station H. Where large bins are being filled with containers, the apparatus is disposed within reach of the bin, and where box cars or trucks are being filled the whole apparatus is located inside the car or truck.

In order to provide for vertical stability of the containers as the groups A are piled on top of each other to produce a stack in the receptacles C, it is customary to interlock the flanges F of the containers, i.e. the flanges of the containers in the next above row are set back of the flanges of the containers in the under row so as to prevent the vertical stack from leaning forward and toppling over. Each row may be set back or the groups may be alternated as shown in Fig. 3.

This offsetting of the container flanges F preferably is effected as the containers are delivered to the conveyor G. For this purpose the two container delivery runway sections 43, 43 are offset relative to each other a distance X as shown in Fig. 4 so that the section 43 delivers containers B on top of the lower row of containers in such a relation as to locate the flanges F of the containers in the upper row, in back of the containers in the lower row as shown in Fig. 3. Thus, as the groups A of containers are formed, the flanges F of the containers are in the proper position for stacking.

In cases where each group A is required to consist of only one row of containers B as shown in the modified form of the invention in Fig. 6, the auxiliary or second container delivery runway section 43 is omitted so that containers B will be delivered only to the conveyor pockets 36 between the displacement elements J.

In another modified form of the invention as illustrated in Figs. 5 and 7 the individual container support and spacer members 35 are omitted and a plurality of the containers are delivered to each of the spaces between the displacement elements J, the containers being supported on a table or ledge supports 53. In such a modified form of the invention where a multiple row group A is to be formed it is desirable that the lower row of containers be formed before the top row is superimposed upon them. Hence the auxiliary runway section 43 is disposed in horizontally spaced relation to the lower row runway section 43, preferably adjacent the operator's station H as shown in Fig. 5.

Thus in all cases, groups A of containers are formed on the conveyor G in such a manner that they are separated by the displacement elements J and are thereby removable as individual groups or units which are readily piled on top of each other to produce stable stacks of containers ready to be shipped or stored as desired.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for forming groups of open containers for transfer to a stack thereof, comprising a conveyor extending along a path of travel and having means for actuating the same, a plurality of displacement elements having a dimension substantially that of the container diameter disposed in longitudinally spaced relation upon said conveyor for setting off between adjacent elements a row group of adjacently disposed containers advanced by said conveyor, and means for individually feeding the containers successively into position between said displacement elements to form a plurality of longitudinally spaced container groups each defined by an adjacent pair of said displacement elements to facilitate individual transfer of said groups from said conveyor without disturbing the adjacent groups thereon.

2. An apparatus of the charatcer defined in claim 1 in which said feeding means is arranged to simultaneously feed a continuous longitudinal row of containers into position on top of said first row thereof and in staggered relation thereto to produce a plurality of superimposed long and short row pattern container groups longitudinally defined on said conveyor by said displacement elements to facilitate successive individual transfer of said groups from said conveyor without disturbing adjacent groups thereon.

3. An apparatus of the character defined in claim 2 in which said feeding means comprise a pair of separate container runways terminating above and adjacent the path of travel of said conveyor.

4. An apparatus of the character defined in claim 1 in which said displacement elements comprise dummy containers of the same container diameter carried on and attached to said conveyor for confining a longitudinal row of containers between each pair thereof.

5. An apparatus of the character defined in claim 1 in which said displacement elements comprise a plurality of axially and transversely disposed substantially cylindrical rings having an outside diameter substantially equal to the outside diameter of said containers and attached to said conveyor.

6. An apparatus of the character defined in claim 1 in which said conveyor is provided therealong with a plurality of longitudinally spaced transverse spacer members disposed between said displacement elements and defining individual confining pockets for the containers disposed in the longitudinal rows thereof between said displacement elements.

7. An apparatus of the character defined in claim 1 in which said conveyor comprises a horizontally disposed endless chain, and in which said chain carries a plurality of equally spaced spacer members defining between adjacent members individual pockets for supporting and confining individual containers arranged in a longitudinal row along said conveyor, and in which certain of said spacer members carry said displacement elements to set off in said row said confined container groups.

References Cited in the file of this patent

UNITED STATES PATENTS

| | | |
|---|---|---|
| 1,843,453 | Littlefield | Feb. 2, 1932 |
| 2,211,433 | Papendick | Aug. 13, 1940 |